Jan. 5, 1943.   A. G. HORVATH   2,307,271
GASOLINE DISPENSING PUMP ILLUMINATED DIAL
Filed Aug. 15, 1940   2 Sheets-Sheet 1
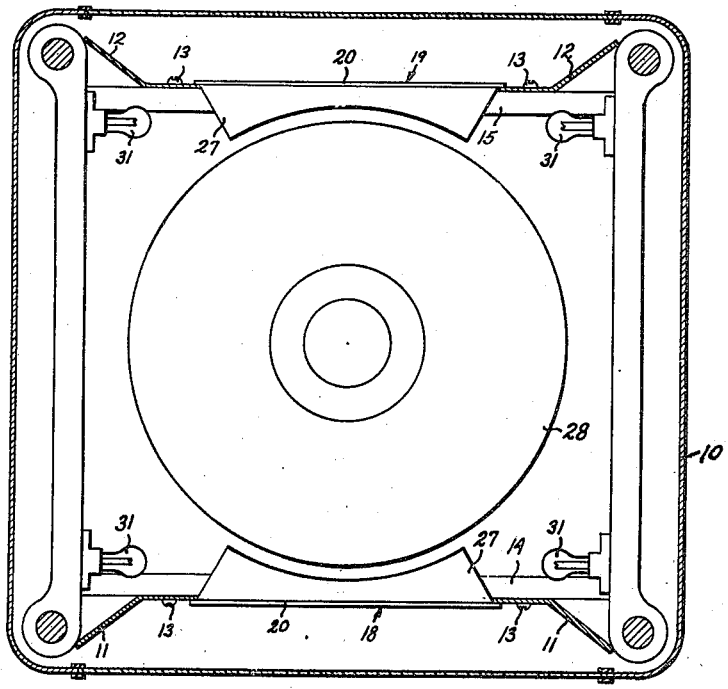
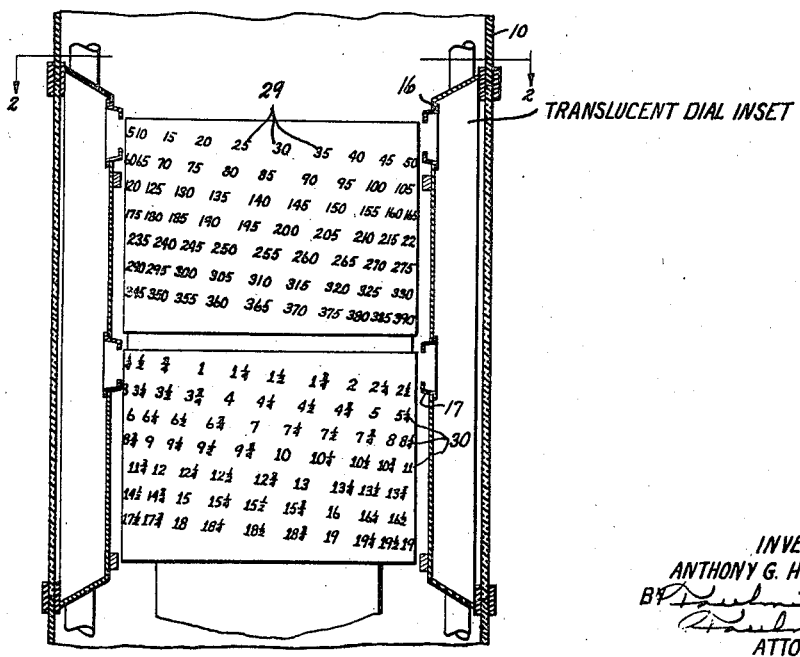
INVENTOR
ANTHONY G. HORVATH
ATTORNEYS Jan. 5, 1943.  A. G. HORVATH  2,307,271
GASOLINE DISPENSING PUMP ILLUMINATED DIAL
Filed Aug. 15, 1940  2 Sheets-Sheet 2
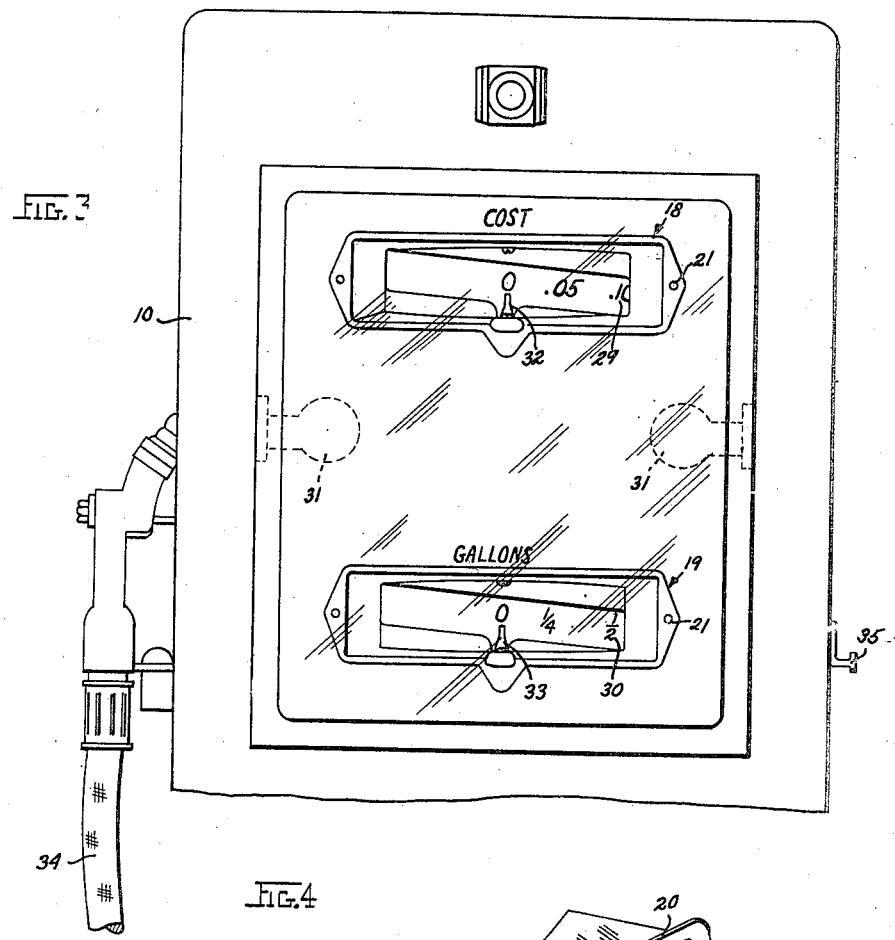
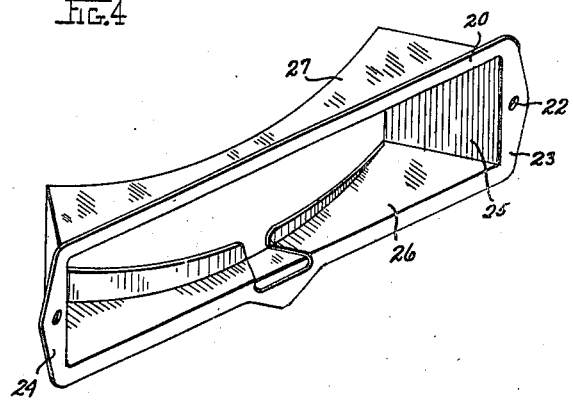
INVENTOR
ANTHONY G. HORVATH
ATTORNEYS Patented Jan. 5, 1943

2,307,271

UNITED STATES PATENT OFFICE 2,307,271

GASOLINE DISPENSING PUMP ILLUMINATED DIAL

Anthony G. Horvath, Dayton, Ohio, assignor to The Dayton Pump and Manufacturing Company, Dayton, Ohio, a corporation of Ohio Application August 15, 1940, Serial No. 352,824

3 Claims. (Cl. 116—129)

This invention relates to a measuring device, and in particular to indicating devices in connection with measuring devices for indicating the cost and/or quantity of dispensed goods. The invention is of particular importance in connection with gasoline dispensers in which a cylindrical drum carrying characters indicating the cost and/or quantity of the dispensed gasoline is rotated and lifted in a casing closely surrounding said drum.

Due to the specific arrangement of such rotating and simultaneously axially moving drum, little and rather inconvenient space is left for providing lamps to illuminate characters on the drum. The heretofore known gasoline dispensers of the type under consideration had the drawback that the characters on the drum were poorly illuminated, and as a matter of fact were made illegible by a shadow cast on the characters by portions of the casing covering the drum.

It is an object of the invention to provide an indicating device of the character above referred to which is simple in construction and avoids the drawback pointed out above.

It is a further object of the invention to provide an indicating device for indicating the cost and/or quantity of dispensed goods in which a rotatable and axially movable indicating drum is mounted in a closely fitting casing, and in which a character on the drum may appear fully illuminated at a reading slot in the casing.

It is a further object of the invention to provide an indicating device as set forth in the preceding paragraph, in which the reading slot is surrounded by light diffusing material.

A still further object of the invention consists in providing an indicating device for indicating the cost and/or quantity of dispensed goods, in which the rotatable and axially movable indicating drum is mounted in a closely fitted casing provided with one or more reading slots through which some of the indicating characters are visible, and in which light beams of a light source are diffused through plastic translucent material confining the reading slot or slots.

These and other objects and advantages of the invention will appear more clearly from the following specification in connection with the accompanying drawings in which:

Figure 1 illustrates a vertical section through a portion of a gasoline dispenser comprising a drum with characters for indicating the cost and quantity of the dispensed gasoline;

Figure 2 is a section along the line 2—2 of Figure 1;

Figure 3 is a view of a portion of the casing surrounding the indicating drum and illustrates the arrangement of the reading slots and the light source;

Figure 4 shows a light diffusing member according to the invention confining the reading slot.

General arrangement

The measuring indicating device according to the invention comprises a casing with a closely fitting rotatable drum therein having a series of characters thereon for indicating the price and cost of the dispensed goods. The casing surrounding the drum has one or more reading slots through which the characters indicating the cost and/or quantity will appear. The reading slots are confined by translucent, preferably pressed pieces of plastic material which are inserted in corresponding openings of the generally metallic casing. The inside of the slot confining pieces are curved so as to closely follow the configuration of the drum and are provided with bottom, top and side pieces so as to prevent the lamps inside the casing from directly illuminating the dial. However, due to the translucent character of the slot confining pieces, the light beams emanated from the said lamps are diffused, thereby evenly and properly illuminating that dial portion which appears in the reading slot.

Structural arrangement

Referring now to the drawings, the numeral 10 designates the casing of a gasoline dispenser which is preferably made up of sheet metal. The front and rear portions of the casing 10 comprise front and rear plates 11 and 12 respectively, which are connected in any convenient manner, for instance by the screw 13 with transverse beams 14 and 15 forming stiffening members of the casing 10. The front and rear plates 11 and 12 are each provided with two transverse openings 16 and 17 in which are inserted reading slot members 18 and 19. As will be seen from Figure 2 and Figure 4, which later illustrates the reading slot member in perspective, the reading slot member has a flange 20 adapted to engage with its inside the outside of the front and rear plates 11 and 12 and to be fastened thereto by means of screws 21 passing through corresponding openings 22 in the flange portions 23 and 24.

As will further appear from Figure 4 the slot members 18 and 19 are provided with side portions 25 and bottom and top portions 26 and 27 which on their inside conform to the configuration of a rotatable and axially movable drum 28, provided with a series of characters 29 indicating the cost of the dispensed gasoline and with a series of characters 30 indicating the number of gallons dispensed.

The particular arrangement of the individual characters on the drum in inclined lines does not form a part of the present invention and is well known in the art. Arranged between the slot members 18 and 19 are bulbs 31 for illuminating those characters 29 and 30 which appear in the reading slot. Each slot member is provided with a pointer 32, and 33 which indicates in connection with the characters aligned therewith the cost and/or quantity of the dispensed gasoline. The slot members 18 and 19 are of translucent material, preferably of pressed plastic material and may be of different colors to cause various illuminating effects. The gasoline dispenser shown in the drawings is provided in the usual manner with the dispensing hose 34 and a resetting member 35 for resetting the drum after the dispensing operation has been finished.

Although the present invention has been described in connection with a gasoline dispenser, it is of course, understood that the invention is by no means limited to such gasoline dispensers, but may also be used in connection with other measuring and indicating devices. Furthermore, the arrangement of the bulbs 31 may be varied in any convenient manner and if desired the shape of the slot members 18 and 19 may be likewise varied.

It will be understood that I desire to comprehend within my invention such modifications as come within the scope of the claims and the invention.

Having thus fully described my invention, what I claim as new and desire to secure by Letters Patent is:

1. In combination in an indicating device, measuring means comprising a rotatable drum having characters thereon for indicating the cost and/or quantity of dispensed goods, a non-translucent casing surrounding said drum and provided with a cut-out portion, a translucent frame member of light diffusing material inserted through said cut-out portion and into said casing and between the drum and casing and having a reading slot therein to make a predetermined number of characters visible from the outside of said casing, and a light source inside said casing but outside said drum, for emanating light beams through a translucent portion of said frame member to illuminate the characters appearing in said slot.

2. In a gasoline dispenser, a rotatable and axially movable drum with characters indicating the cost and/or quantity of the dispensed gasoline, a metal casing surrounding said drum and being provided with front and rear plates each having two superimposed openings thereon, a translucent frame member inserted in each of said openings and into said casing and between the drum and casing and confining a reading slot, said translucent member having its inside configured to the curvature of said drum and being made of plastic material, and a light source arranged in said casing but outside said drum and laterally of said translucent member for emanating light beams through said translucent members to illuminate that portion of the drum which is visible through said slot.

3. In combination in an indicating device, measuring means comprising a rotatable drum with indicating means thereon for indicating the cost and/or quantity of dispensed goods, a metal casing surrounding said drum and provided with an opening, a translucent frame member projecting in said opening and into the casing and between the drum and casing and confining a reading slot through which a portion of said drum is visible, said translucent member having converging side portions and being provided with bottom and top portions and having its inner periphery configured to the configuration of said drum, and a light source mounted laterally of said translucent member and between the inside of said casing and the outside of said drum.

ANTHONY G. HORVATH.